Nov. 14, 1961 S. F. REED 3,008,532
AUTOMATIC PILOT FOR MOTOR VEHICLES
Filed Jan. 17, 1958 2 Sheets-Sheet 1
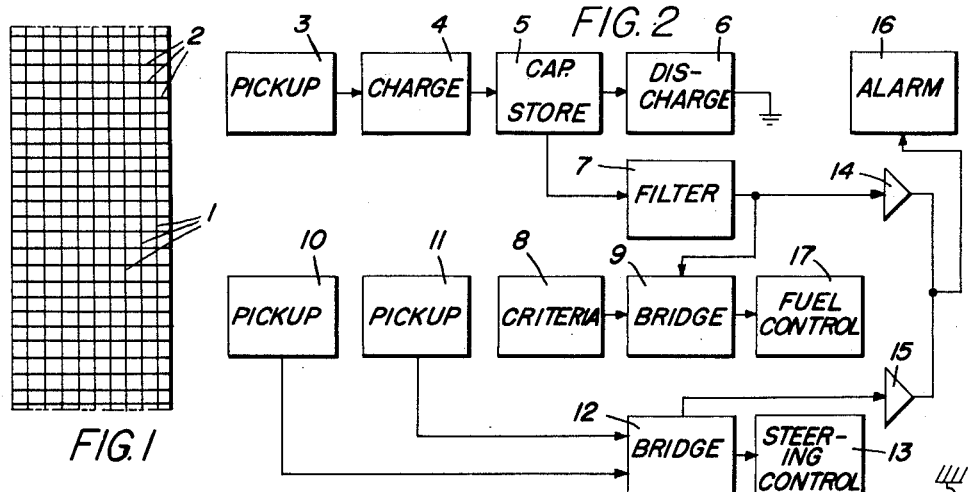
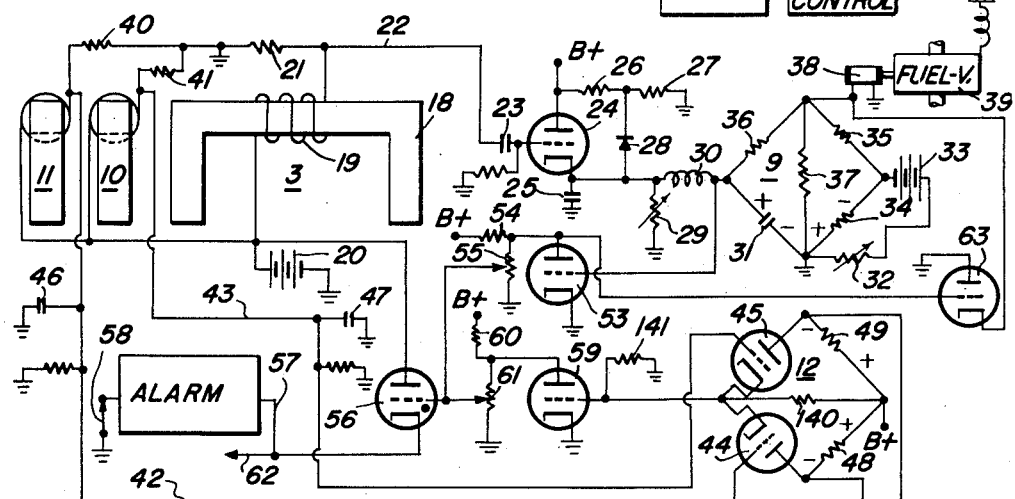
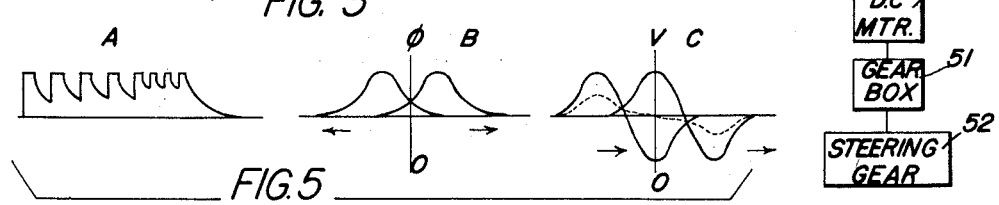
INVENTOR
STANLEY F. REED
BY
ATTORNEY Nov. 14, 1961  S. F. REED  3,008,532
AUTOMATIC PILOT FOR MOTOR VEHICLES
Filed Jan. 17, 1958  2 Sheets-Sheet 2
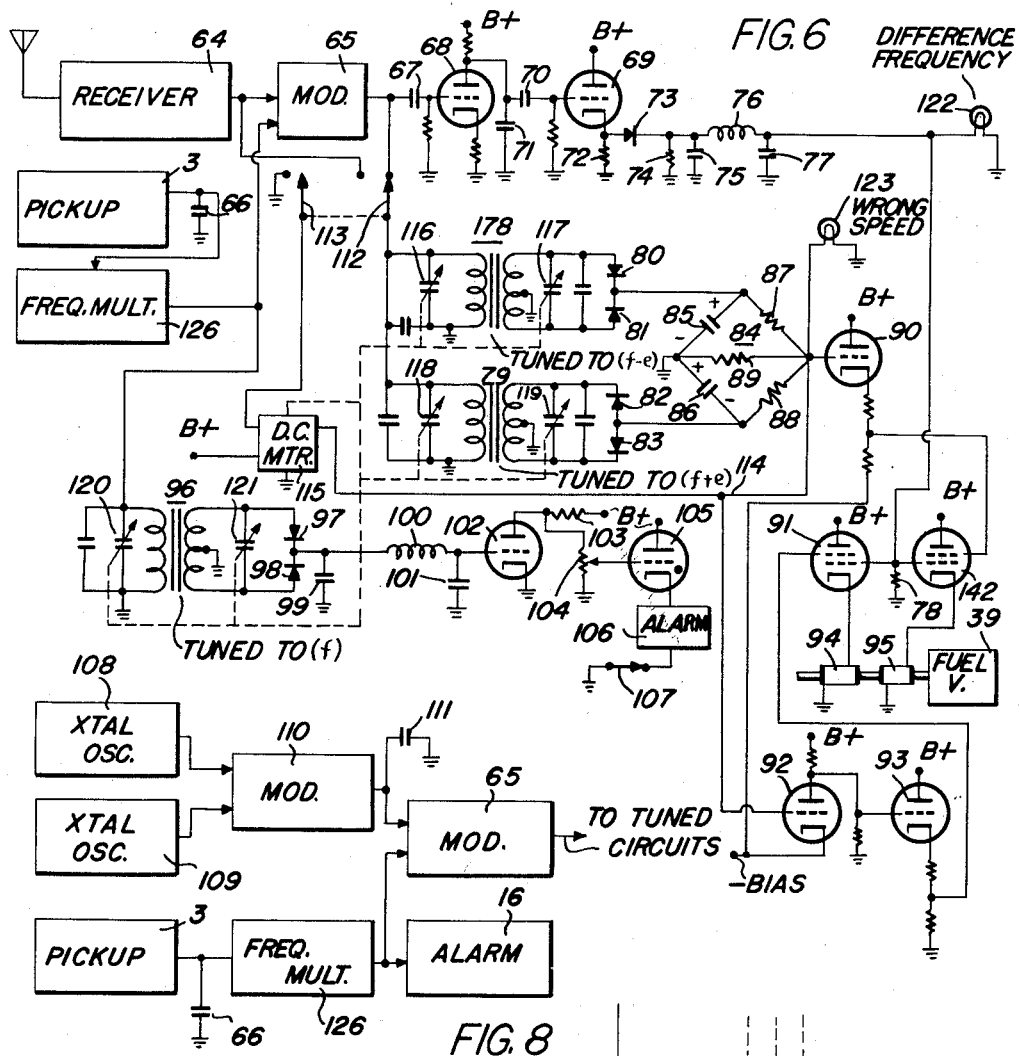
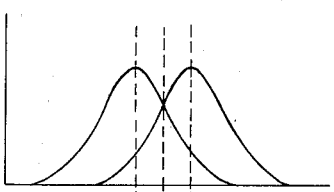
FIG. 7
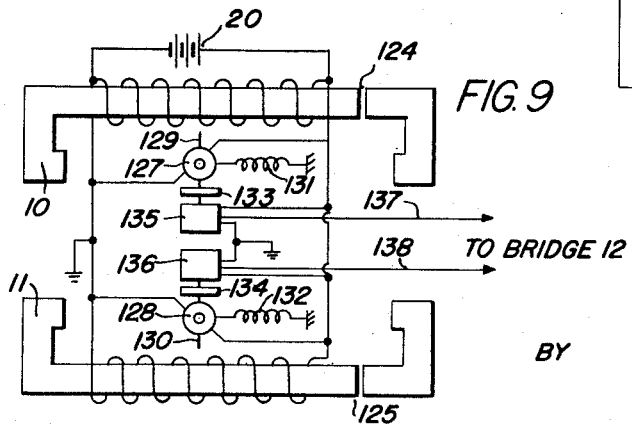
INVENTOR
STANLEY F. REED
BY Leo Wilder
ATTORNEY United States Patent Office 3,008,532
Patented Nov. 14, 1961

3,008,532
AUTOMATIC PILOT FOR MOTOR VEHICLES
Stanley F. Reed, Falls Church, Va., assignor to Reed Research Inc., Washington, D.C., a corporation of Delaware
Filed Jan. 17, 1958, Ser. No. 709,485
16 Claims. (Cl. 180—82.1)

This invention relates to automatic pilot devices, and more particularly to the method of automatically controlling the speed and bearing of a motor vehicle.

In this day of high powered automobiles, designed to operate at high speeds over long stretches of super highways, the possibility of drivers failing to devote full attention to the hazards of driving is becoming increasingly dangerous. Drivers are lulled into a semi-conscious state by the monotony of the road, each mile of which looks exactly like the mile before. This results in many traffic accidents, because of inattention to speed or bearing of a vehicle.

The invention reduces these hazards by providing for automatic regulation of the speed and bearing of the vehicle. An illustrative embodiment of the invention uses steel reinforcing network under a concrete or asphalt road as an indication of the heading of the road, and the distance traversed in a given time. The longitudinal rods of the network provide the heading indication and the spacing between the transverse rods determines the speed of the vehicle.

Accordingly it is a principal object of this invention to provide means for steering a vehicle and regulating its speed in accordance with the physical characteristics of the road.

This and other objects of the invention will be brought out more fully in the following description of an illustrative embodiment thereof, when considered in connection with the accompanying drawings, in which:

FIGURE 1 is an illustration of a roadway with its steel reinforcing network.

FIGURE 2 is a functional block diagram of one embodiment of a system constructed in accordance with the invention for regulating the speed and for controlling the steering of a motor vehicle.

FIGURE 3 is a schematic diagram of the system illustrated in FIGURE 2.

FIGURE 4 is a diagram of the cross section of a road illustrating the position of the pickups of the device of FIGURE 2 with respect thereto.

FIGURE 5 comprises a series of waveforms illustrating the operation of the device of FIGURE 3.

FIGURE 6 is a functional block diagram, partly in schematic form, of an alternative system, constructed in accordance with the invention, for controlling the speed of a motor vehicle.

FIGURE 7 is a graph of the frequency responses of the tuned circuit used in the device of FIGURE 6.

FIGURE 8 is a functional block diagram of an alternative method of providing a reference frequency, for use in the system shown in FIGURE 6.

FIGURE 9 is a diagram of an alternative means for deriving reference potentials for use in controlling the bearing of a motor vehicle.

Referring now to FIGURE 1, there is shown an illustration of how a modern road is constructed. The steel network under the road is comprised of longitudinal rods 1 and transverse rods 2 buried in the road material whether concrete or asphalt. These rods are steel and therefore have a high magnetic permeability. FIGURE 1 is intended to represent any section of a modern road which includes longitudinal and transverse reinforcement rods formed of material having a high magnetic permeability. While the system disclosed herein functions in an optimum manner in conjunction with roads which were built therefor, it should be clear that this system will function properly with any road having longitudinal and transverse rods that are positioned in accordance with the "Specifications for Concrete Pavement Construction" as published by the American Association of State Highway Officials, or the applicable Federal specifications governing the building of reinforced pavement construction.

FIGURE 2 shows in block diagram form how these rods may be used for controlling the speed and steering of a motor vehicle. Pickup 3 derives a signal from the transverse rods each time one is passed over by the pickups. This signal is fed into charge means 4 which charges storage capacitor 5 each time a transverse rod is passed. This charge is allowed slowly to dissipate through discharge means 6 until the next input from pickup 3 again charges capacitor 5.

The D.C. component of the voltage stored across capacitor 5 is extracted by filter 7 and this D.C. potential is compared with a pre-set criterion from criteria means 8, in bridge 9. The output of bridge 9 is used to regulate the fuel flow 17 which controls the speed of the engine.

At the same time, pickups 10 and 11 present an indication of the relative position of a longitudinal rod with respect to the vehicles, and the outputs of the two pickups 10 and 11 are compared in bridge 12 which controls the steering control 13.

Another output of bridge 12, and the output of filter 7 are both amplified in amplifiers 14 and 15 to control alarm means 16. This circuitry is so constructed and arranged as to trigger alarm 16 whenever the pickups 3, 10 and 11 fail to recognize the reinforcing rods under the surface of the road.

Referring now to FIGURE 3, a schematic diagram of the system in FIGURE 2 is shown. Pickup 3 consists of a magnetic circuit 18 having three legs and powered through a coil 19 by a battery 20. In series with the battery 20 and coil 19 is a resistor 21, the junction between the resistor 21 and battery 20 being grounded. Flux lines 139 shown in FIGURE 4, join one side of the magnetic circuit to the other, and normally pass only through air which has a very low permeability. But when a transverse steel reinforcement rod is passed, the flux passes through the steel, reducing the reluctance in the circuit. With the reluctance reduced, the flux increases and generates a voltage in coil 19 which is opposite to the voltage drop across it caused by battery 20. Thus the current through resistor 21 is momentarily increased. After the reinforcement rod is passed, the flux is reduced to its former state and the current flow through resistor 21 is momentarily decreased.

Thus, each time a transverse reinforcement rod is passed resistor 21 delivers a positive pulse over line 22 through coupling condenser 23 to the grid of triode 24, which conducts through charging capacitor 25 in its cathode circuit. A limiter comprising voltage dividers 26 and 27 and diode 28 limits the charge which may be put on capacitors 25.

The charge on capacitor 25 is gradually leaked off through resistor 29, which may be adjusted to a predetermined rate of decay. The resulting waveform is shown in FIGURE 5A, from which it is apparent that the D.C. component of the waveform varies directly with the frequency at which the reinforcement rods are passed.

The D.C. component is removed by means of filter choke 30 and capacitor 31. The voltage appearing across capacitor 31 is D.C. and of amplitude proportional to the frequency at which the transverse reinforcement rods are passed.

Resistor 32 is set to a predetermined value inversely proportional to the desired speed. This determines the current flow from battery 33 through resistors 32 and 34, and consequently, the voltage drops across resistor 34. A voltage divider comprising resistors 35 and 36 is connected between the ungrounded ends of capacitor 31 and resistor 34 and the junction in the divider is returned to ground via resistor 37. The voltage drop across resistor 37 will thus be proportional to the difference between the two voltages represented across capacitor 31 and resistor 34. If the two voltages are equal, the junction of the voltage divider will be at zero potential, but if the voltages are not equal solenoid 38 fed from this junction will be driven one way or the other, depending on which voltage has the greater absolute value. The solenoid 38 controls a valve 39 which determines how much fuel is fed to the engine. With the fuel control valve changed, the speed of the engine will change until the bridge is balanced and the desired rate of speed is attained.

If, in building highways, the reinforcement rods are spaced a distance proportional to the speed at which it is safe to travel on that part of the road, resistor 32 need be set only once on first entering the highway, and thereafter left in the same position. The speed of the vehicle will be automatically adjusted to conform to the legal speeds by the spacing of the rods under the concrete. If additional reinforcement is needed on the high speed parts of the road, it can be accomplished by the use of less permeable metals, such as aluminum or a non-magnetic steel alloy. It should be noted that when applicant's system is to be utilized with conventional roads which are already in existence, the speed of the vehicle will be adjusted to the existing transverse rod spacing, and manual readjustment will be required whenever this transverse rod spacing is varied. However, it should be noted that the vast majority of steel-reinforced roads built in the past ten years have been constructed to comply with the uniform specifications set forth by the State and Federal agencies supervising such construction.

Pickups 10 and 11 are constructed in the same manner as pickup 3 but positioned perpendicular thereto, as shown in FIGURE 4. The amount of flux linkage between each pickup and the longitudinal reinforcement rods is dependent on the distance of each pickup from the rod. The curve of flux linkage with respect to distance displacement is shown in FIGURE 5B, from which it is apparent that the flux linkage of the two pickups is equal when they are the same distance from the longitudinal rod. If the pickups are displaced from that position, the flux linkage of one pickup will increase and that of the other will decrease. FIGURE 5C shows in solid lines the wave forms of the voltage generated by resistors 40 and 41 which are proportional to the change in flux through their associated magnetic circuits.

These voltages are fed over lines 42 and 43 to the grids of triode 44 and 45 in bridge 12. The high frequency components from the transverse reinforcement rods are filtered out by capacitors 46 and 47.

The two pickups 10 and 11 are positioned so that the curves of their flux linkage with the longitudinal reinforcement rod, shown in FIGURE 5B intersect at their points of maximum slope. Thus, when the position of the pickups is changed with respect to the longitudinal reinforcement rod, the voltages generated at the control grids of triodes 44 and 45 are opposite in phase and at their maximum potentials. The cathodes of triodes 44 and 45 are biased by the voltage divider comprising resistors 140 and 141 so that at steady state, an intermediate amount of current is drawn through both tubes through resistors 48 and 49 respectively. Thus there is no difference in voltage at the plates of the two triodes and no current flows through the D.C. motor 50. When the position of the pickups changes, however, steady state no longer exists and one triode conducts much more than the other, producing a voltage differential between the plates of the two triodes, the amplitude of which is proportional to the rate of change of position with respect to time, and the polarity of which depends upon the direction of movement.

The D.C. motor 50 is powered to control the steering gear 52 through a mechanical linkage including a gearbox 51, the direction of rotation being dependent on the polarity of the input, and the torque proportional to the rate of change of position with respect to time. Thus for very sudden changes of position, the steering control acts almost instantly, while for more gradual changes, the steering control acts more smoothly.

An up and down motion of the motor vehicle, caused by bumps in the road will not affect the steering control since the operation of both pickups will be affected equally, and thus present no difference voltage to the bridge.

If the vehicle should encounter highway where no reinforcement rods have been laid, the voltage across capacitor 5 soon decays to zero, as shown in FIG. 5A. This cuts off conduction in triode 53, and raises the value of plate voltage by reducing the current in resistor 54. Thus the current through resistor 55 is increased and the voltage at the top made more positive. This causes thyratron 56 to conduct current through an alarm circuit 57. The alarm circuit rings a bell and flashes a light to inform the driver that he must take over control of the vehicle. The alarm will remain on even though more reinforcement rods are encountered, until reset switch 58 is opened.

When the D.C. component of the capacitor waveform is very low, the fuel valve will be opened to attempt to equalize the bridge. But when the D.C. component is low enough to cut off triode 53, indicating a "no reinforcing rods" condition, the plate of triode 53 produces a positive potential that renders triode 63 conducting. This tube shorts out solenoid 38 so that no additional fuel is called for. A spring then returns the fuel valve to zero to stop the engine.

Similarly, if the automobile loses the longitudinal reinforcement rod, the value of voltage at the grids of triodes 44 and 45 must first pass through a point, shown in FIG. 5C, where the voltage on the grid of one tube is at steady state, and the other is negative. At this point the current drawn through resistor 141 is at a minimum, and thus the grid of triode 59 is at a minimum. The voltage at the plate will then be maximum, since less current is drawn through resistor 60. More current flows through resistor 55 raising the voltage on its top to fire thyratron 56. The thyratron is therefore fired to actuate alarm circuit 57 if a defect occurs in the operation of any part of the system.

No matter what error occurs, thyratron 56 will remain conducting until reset switch 58 is opened. Both the speed control and direction control may again determine the operation of the vehicle if additional reinforcement rods are encountered after the alarm is triggered.

Line 62 from the cathode of the alarm thyratron 56 may be used to actuate any additional control circuits which may be required, sounding the horn, or braking the vehicle to a stop, for example.

Both the speed and direction controls described above may be over-ridden by the driver of the vehicle when conditions of driving so require.

Referring now to FIG. 6, there is shown an alternative embodiment for automatically controlling the speed of a motor vehicle.

In this embodiment a predetermined standard frequency is used as a reference with which a harmonic of the frequency of passage of the transverse reinforcement rods is compared.

The carrier of the standard frequency is received, amplified, and the standard frequency removed by receiver 64, which frequency is then fed to modulator 65. The other input to modulator 65 is from pickup 3 through filter condenser 66, which removes all high frequency components of the input from the transverse rods, and through frequency multiplier 126. The result is to present to modulator 65 a sine wave at a multiple of the frequency with which the transverse reinforcement rods are passed.

The output of the modulator contains frequency components of the standard frequency, the input frequency, and the sum and difference frequencies. The composite is fed through blocking condenser 67 to amplifier 68. Blocking condenser 67 is large and thus blocks only D.C., passing all other frequencies.

The output of triode amplifier 68 is fed to cathode follower 69 through a condenser network containing condensers 70 and 71. Condenser 70 is a blocking condenser similar to 67, and condenser 71 is a filter condenser filtering out all frequencies higher than the difference frequency.

The difference frequency appears across resistor 72 in the cathode circuit of cathode follower 69, and is then rectified by diode 73. The resulting pulsating D.C. appears across resistor 74, filtered by a filter network containing condensers 75 and 77, and inductance 76 and fed to resistor 78 and difference frequency lamp 122 in parallel. The voltage thus appearing across resistor 78 is a positive D.C. potential when there is a difference frequency, and zero when there is no difference frequency as when the two frequencies fed into the modulator are equal. Lamp 122 visually indicates the presence of a difference frequency. The output of modulator 65 is also presented to two tuned transformers 178 and 79 through switch 112. One is tuned a few cycles above the standard frequency, and the other a few cycles below the standard frequency. The response curves for these tuned circuits are shown in FIG. 7. Both circuits have equal response at the standard frequency, though somewhat lower than their peak responses.

The tuned circuits associated with transformers 178 and 79 are constructed to have a Q high enough to exclude any frequency components of the modulated output except the standard frequency and the input frequency when it is reasonably close to the standard frequency.

The outputs of the tuned circuits associated with transformers 178 and 79 are rectified by diodes 80 and 81, and 82 and 83, respectively, and fed into capacitors 85 and 86 of bridge 84, 85 being charged positive with respect to ground, and 86 negative with respect to ground. The "hot" ends of these capacitors are connected by a voltage divider comprising equal resistors 87 and 88, the junction of which is returned to ground via resistor 89. The voltage across resistor 89 will be equal to half the difference between the absolute values of voltage across condensers 85 and 86, and have the sign of whichever has the higher absolute value. A wrong speed lamp 123 is connected across resistor 89 to visually indicate that the bridge is unbalanced.

The voltage across resistor 89 is fed to the screen of tetrode 142 via cathode follower 90, and to the screen of tetrode 91 via inverter 92 and cathode follower 93. Thus the screen potentials of the two tetrodes are regulated so as to be equal when bridge 84 is balanced, and otherwise unequal, with the polarity of the inequality dependent upon the direction of unbalance in bridge 84. The control grids of the two tetrodes are positive when a difference frequency is detected. Thus, whenever a difference frequency is detected, one tetrode will conduct more than the other, depending on whether the input frequency is higher or lower than the standard frequency.

Current passing through tetrodes 142 and 91 when they are conducting, passes through oppositely wound solenoid coils 94 and 95. The direction of motion of the arm of the solenoid is dependent on the relative currents through coils 94 and 95, and controls the volume of fuel passing through fuel valve 39, thus regulating the speed of the engine.

The voltage across resistor 89 is also fed to the armature of a D.C. motor 115 over line 114. The field of the motor is connected between a positive potential and ground through switch 113.

Switches 112 and 113 operate together, and when the field of motor 115 is switched on, by switch 113, the pure standard frequency is fed into the tuned circuits associated with transformers 178 and 79 via switch 112. When this occurs, if these circuits associated with transformers 178 and 79 are properly tuned, the output of the bridge and the input to the armature will be zero. But due to heat, causing drift in the tuned circuits, or the deliberate change of the standard frequency (under circumstances described hereinafter) the bridge may not be balanced, and a voltage is presented across the armature of motor 115, the polarity of which depends on the direction of imbalance of the bridge.

The motor will then rotate the four trimmer capacitors 116, 117, 118, and 119, in the tuned circuits associated with transformers 178 and 79, and trimmer capacitors 120 and 121 in tuned circuit 96, described hereinafter, thus changing the frequencies to which circuits are tuned. When the circuits are again tuned so that the response is equal in the two circuits for the standard frequency, the motor stops rotating.

In practice therefore, turning on switches 112 and 113 for an instant will align all the tuned circuits to the proper frequencies for operation, irrespective of whether drift of the tuned circuits or drift of the standard frequency caused the misalignment.

The driver knowns that alignment is required when the states of the difference frequency lamp 122 and the wrong speed lamp 123 are not the same. If one is lit and the other is not, alignment is required When the speed of the engine is changed, the input frequency from the transverse reinforcement rods changes to correspond to the standard frequency, making the speed of the vehicle dependent solely on the spacing of the transverse reinforcement rods under the surface of the road. As an example (with frequency multiplier 126 multiplying the input frequency by a factor of 10), if the standard frequency as fixed at 1000 cycles per second, and the transverse rods are one foot apart, the vehicle will travel at 100 feet per second or 68 miles per hour. If the rods are 6 inches apart, the vehicle will travel at 50 feet per second or 34 miles per hour.

A change of the standard frequency may be accomplished at the transmitter (not shown) by changing the frequency with which the carrier is modulated. Thus receiver 64 would detect a different standard frequency. This feature may be used to advantage in varying the speed of vehicles on the road in response to whether conditions in the geographical area in which the transmitter is located. In bad weather, for example, the standard frequency may be set at 50 cycles per second, cutting the speed of all vehicles in half. And if the transmitter goes off the air, speed control systems in all vehicles cease to operate, putting the drivers on notice that they must use maximum care in driving.

The harmonic of the frequency derived from the transverse rods generated by frequency multiplier 126 is also fed to another tuned transformer 96 which is tuned to the standard frequency and controlled by motor 115, as described above. The Q of this circuit is comparatively low and the bandwidth of the circuit is adjusted to include the entire bandwidth of the tuned circuits associated with transformers 178 and 79 but no more, and thus produce an output only when the input frequency is capable of being detected by the tuned circuits associated with transformers 178 and 79. The output is rectified by diodes 97 and 98, filtered in a filter network comprising condensers 99 and 101 and inductance 100, and fed to inverter 102. The output from inverter 102 feeds into a voltage divider comprising resistors 103 and 104, and a tap on resistor 104 feeds to a thyratron 105.

If there is no input frequency, or if the frequency of the input is not within the range of detection of the tuned circuits associated with transformers 178 and 79, inverter 102 is cut off, and thyratron 105 is fired, sending current through the alarm circuit 106 to reset switch 107. The alarm indicates to the driver that the system does not have control of the vehicle, and that he must resume control. Even with the alarm sounded, the speed control will again take over the operation of the throttle if more transverse rods are encounterd, although without an input frequency, the screens of tetrodes 142 and 91 are equal and the grids are at ground since there is no detectable difference frequency.

In operation, the driver must manually increase the speed of his car on first entering the highway, until the input frequency is reasonably close to the standard frequency. Then the reset switch 107 is thrown, and if the alarm is not sounded, he knowns the automatic pilot is in control of the car.

Referring now to FIG. 8, there is shown an embodiment for deriving a standard frequency without the use of a receiver as shown in FIG. 6. In this embodiment, two crystal oscillators 108 and 109 produce frequencies which are modulated in modulator 110. The high frequency components are filtered out by filter condenser 111, and the difference frequency fed to modulator 65. The same pickup and alarm system, as was described in connection with FIG. 6, is used, and the systems are similar in all other respects.

This method eliminates the need for a transmitter and receiver to determine the standard frequency since it is determined by the difference frequency between two crystal oscillators. Thus, if one crystal was cut to oscillate at 10,000 cycles per second and the other at 11,000 cycles per second, a standard frequency of 1,000 c.p.s. would be produced.

Other systems to determine a standard frequency will, of course, occur to those skilled in the art, such as the use of a single crystal oscillator beating with an unmodulated carrier to produce a standard frequency. A frequency would then be able to accomodate the speed of vehicles to more hazardous weather conditions, as in the system of FIG. 6.

Referring now to FIG. 9, there is shown an alternative embodiment for deriving signals responsive to the position of the vehicle with respect to the road. Unlike that shown in FIG. 2, the system of FIG. 9 is responsive to the position of the vehicle with respect to the longitudinal rods and not the change in position.

The two magnetic circuits 10 and 11 are powered by battery 20, and are positioned as shown in FIG. 4. Battery 20 sets up a flux in each magnetic circuit, the magnitude of which is different for each different value of reluctance in the circuit.

When no rods are within the field of either circuit, the reluctance of the air gap is very high, and little flux flows through the circuit, but when a rod is within the field more flux flows through it, thus increasing the flux through the circuit.

Leakage flux, present in all magnetic circuits, leaks between the vertical arms of each circuit, past coils 127 and 128. Each of these coils is connected across the battery 20, and each has a shaft 129 and 130 respectively upon which it may rotate, the rotation being restrained by springs 131 and 132 and damped by flywheels 133 and 134. Connected to shafts 129 and 130 are potentiometers 135 and 136, which are each connected across battery 20, with two circuits 137 and 138 presented from their center taps. Each magnetic circuit has an air gap 124 and 125.

In operation, there is a rotational force produced on each coil proportional to the product of the leakage flux flowing past it and the current flowing through it. The leakage flux can be shown to be:

$$\phi_L = \frac{HR_2}{R_0R_1 + R_0R_2 + R_1R_2}$$

where H is the magnetomotive force, $R_0$ is the reluctance of each air gap 124 and 125, $R_1$ is the reluctance of the leakage flux path through the coils 127 and 128, and $R_2$ is the reluctance of the path through the longitudinal reinforcement rods. The only variable is the $R_2$, and it can be seen that the leakage flux $\phi_L$ varies directly with the value of $R_2$. The value of $(R_0+R_1)$ in the denominator is always larger than $R_2$ and thus an increase in the value of $R_2$ raises the magnitude of the denominator more than it raises the numerator, resulting in a lesser quantity of leakage flux.

The rotational force on each of the coils 127 and 128 is, therefore proportional to the value of $R_2$. If the two magnetic circuits 10 and 11 are equally distant from the longitudinal rod, rotation of each coil 127 and 128 is identical.

The shafts on which the coils rotate are connected to potentiometers 135 and 136, and the value of resistance between the ground end of the potentiometer, and the tap taken from the rotor changes with the rotation of the shaft. If the leakage fluxes of the two magnetic circuits are not identical, potentiometers 135 and 136 have different values of resistance, producing different potentials at outputs 137 and 138 which are then fed to bridge 12 (shown in FIGS. 2 and 3) to control the steering of the vehicle.

Having thus described exemplary embodiments thereof, what I desire to claim as my invention is:

1. In a system for automatically controlling the bearing of a vehicle, the combination comprising; a road having a longitudinal axis and a bearing surface, said road including a steel reinforcing network integrally included therein, said reinforcing network comprising a first group of rods of high magnetic permeability positioned substantially parallel to said longitudinal axis of said road and a second group of rods of high magnetic permeability positioned substantially transversely to said axis of said road, both of said first and second groups of rods positioned substantially parallel to said bearing surface of said road; a steerable vehicle traversing said road, means mounted on said vehicle for deriving electrical signals from the magnetic permeability characteristics of said road indicative of the transverse position of said vehicle thereon, and means mounted on said vehicle for adjusting the bearing of said vehicle in response to said signals.

2. In a system for automatically controlling simultaneously both the speed and bearing of a vehicle, the combination comprising; a road having a longitudinal axis and a bearing surface, said road including a steel reinforcing network integrally included therein, said reinforcing network comprising a first group of rods of high magnetic permeability positioned substantially parallel to said longitudinal axis of said road and a second group of rods of high magnetic permeability positioned substantially transversely to said axis of said road, both of said first and second groups of rods positioned substantially parallel to said bearing surface of said road; a variable-speed steerable vehicle transversing said road, first means mounted on said vehicle for deriving electrical signals from the magnetic permeability characteristics of said road indicative of the transverse position of said vehicle thereon, second means mounted on said vehicle for deriving electrical signals from the magnetic permeability characteristics of said road indicative of the speed of said vehicle with respect thereto, and means mounted on said vehicle for adjusting both the speed and bearing of said vehicle in response to said signals.

3. In a system for automatically controlling simultaneously both the speed and bearing of a vehicle, the combination comprising; a road having a longitudinal axis and a bearing surface, said road including a steel reinforcing network integrally included therein, said reinforcing network comprising a first group of rods of high magnetic permeability positioned substantially parallel to said longitudinal axis of said road and a second group of rods of high magnetic permeability positioned substantially transversely to said axis of said road, both of said first and second groups of rods positioned substantially parallel to said bearing surface of said road; a variable-speed steerable vehcile traversing said road, means mounted on said vehicle for deriving electrical signals from the magnetic permeability characteristics of said road indicative of the two dimensional movements of said vehicle with respect thereto, and means mounted on said vehicle responsive to said signals to adjust the speed and bearing of said vehicle.

4. In a system for automatically controlling simultaneously both the speed and bearing of a vehicle, the combination comprising; a road having a longitudinal axis and a bearing surface, said road including a steel reinforcing network integrally included therein, said reinforcing network comprising a first group of rods of high magnetic permeability positioned substantially parallel to said longitudinal axis of said road and a second group of rods of high magnetic permeability positioned substantially transversely to said axis of said road, both of said first and second groups of rods positioned substantially parallel to said bearing surface of said road; a variable-speed steerable vehicle traversing said road, first means mounted on said vehicle for deriving electrical signals from the magnetic permeability characteristics of said road indicative of the transverse position of said vehicle thereon, second means mounted on said vehicle for deriving electrical signals from the magnetic permeability characteristics of said road indicative of the speed of said vehicle with respect thereto, means responsive to the signals derived by said first and second means for controlling the two dimensional movement of said vehicle with respect to said bearing surface, an alarm mounted on said vehicle operatively associated with said first and second means, and means mounted on said vehicle for actuating said alarm whenever said signals are not of such predetermined magnitude as to cause said means for controlling to respond thereto.

5. In a system for automatically controlling simultaneously both the speed and bearing of a vehicle, the combination comprising; a road having a longitudinal axis and a bearing surface, said road including a steel reinforcing network integrally included therein, said reinforcing network comprising a first group of rods of high magnetic permeability positioned substantially parallel to said longitudinal axis of said road and a second group of rods of high magnetic permeability positioned substantially transversely to said axis of said road, both of said first and second groups of rods positioned substantially parallel to said bearing surface of said road; a variable-speed steerable vehicle traversing said road, said vehicle having an engine and a steering mechanism; first magnetic means mounted on said vehicle for deriving signals from the magnetic permeability characteristics of said road, said first magnetic means so oriented on said vehicle that said signals derived thereby are primarily responsive to said transverse rods; second magnetic means mounted on said vehicle for deriving signals from the magnetic permeability characteristics of said road, said second magnetic means so oriented on said vehicle that said signals derived thereby are primarily responsive to said longitudinal rods; means mounted on said vehicle responsive to said first magnetic means for controlling the speed of said engine; and means mounted on said vehicle responsive to said second magnetic means for controlling the steering mechanism of said vehicle.

6. In a system for automatically controlling simultaneously both the speed and bearing of a vehicle, the combination comprising; a road having a longitudinal axis and a bearing surface, said road including a steel reinforcing network integrally included therein, said reinforcing network comprising a first group of rods of high magnetic permeability positioned substantially parallel to said longitudinal axis of said road and a second group of rods of high magnetic permeability positioned substantially transversely to said axis of said road, both of said first and second groups of rods positioned substantially parallel to said bearing surface of said road; a variable-speed steerable vehicle traversing said road; first means mounted on said vehicle for deriving electrical signals from the magnetic permeability characteristics of said road indicative of the transverse position of said vehicle thereon; second means mounted on said vehicle for deriving electrical signals from the magnetic permeability characteristics of said road indicative of the speed of said vehicle with respect thereto; third means operatively associated with said vehicle for producing generated signals representative of the signals desired to be derived from said first and second means; fourth means mounted on said vehicle responsive to said first means, said second means, and said third means for comparing the derived signals with said generated signals, and means mounted on said vehicle responsive to said fourth means for adjusting the speed and bearing of said vehicle until said derived signals and said generated signals coincide.

7. In a system for automatically controlling simultaneously both the speed and bearing of a vehicle, the combination comprising; a road having a longitudinal axis and a bearing surface, said road including a steel reinforcing network integrally included therein, said reinforcing network comprising a first group of rods of high magnetic permeability positioned substantially parallel to said longitudinal axis of said road and a second group of rods of high magnetic permeability positioned substantially transversely to said axis of said road, both of said first and second groups of rods positioned substantially parallel to said bearing surface of said road; a variable-speed steerable vehicle traversing said road, first means mounted on said vehicle for deriving electrical signals from the magnetic permeability characteristics of said road indicative of the two dimensional movements of said vehicle with respect thereto, second means operatively associated with said vehicle for producing predetermined characteristic signals, third means mounted on said vehicle responsive to said first means and said second means for producing a first signal when said signals derived by said first means correspond to said predetermined characteristic signals and a second signal when said signals derived by said first means do not so correspond, and fourth means mounted on said vehicle responsive to said first signal of said third means to alter the speed and bearing of said vehicle until said third means produces said second signal.

8. In a system for automatically controlling simultaneously both the speed and bearing of a vehicle, the combination comprising; a road having a longitudinal axis and a bearing surface, said road including a steel reinforcing network integrally included therein, said reinforcing network comprising a first group of rods of high magnetic permeability positioned substantially parallel to said longitudinal axis of said road and a second group of rods of high magnetic permeability positioned substantially transversely to said axis of said road, both of said first and second groups of rods positioned substantially parallel to said bearing surface of said road; a variable-speed steerable vehicle traversing said road, first means mounted on said vehicle for deriving electrical signals from the magnetic permeability characteristics of said road indicative of the transverse position of said vehicle thereon, second means mounted on said vehicle for deriving electrical signals from the magnetic permeability characteristics of said road indicative of the speed of said vehicle with respect thereto, third means operatively associated with said vehicle for producing standard criterion signals which correspond to the spacing of said longitudinal and transverse rods and the prevailing road conditions, fourth means mounted on said vehicle responsive to said first means, said second means, and said third means for indicating a noncorrespondence between said derived signals of said first and second means, and said standard signals of said third means, and fifth means mounted on said vehicle responsive to said noncorrespondence for adjusting the speed and bearing of said vehicle until said noncorrespondence is eliminated.

9. In a system for automatically controlling the speed of a vehicle, the combination comprising; a road having a longitudinal axis and a bearing surface, said road including a steel reinforcing network integrally included therein, said reinforcing network comprising a first group of rods of high magnetic permeability positioned substantially parallel to said longitudinal axis of said road and a second group of rods of high magnetic permeability positioned substantially transversely to said axis of said road, both of said first and second groups of rods positioned substantially parallel to said bearing surface of said road; a variable-speed steerable vehicle traversing said road, means mounted on said vehicle for deriving electrical signals from the magnetic permeability characteristics of said road having a frequency indicative of the speed of said vehicle with respect to said road, means operatively associated with said vehicle for generating a standard frequency electrical signal, comparator means mounted on said vehicle for comparing said derived signals with said standard signal, and means mounted on said vehicle responsive to said comparator for controlling the speed of said vehicle.

10. In a system for automatically controlling the speed of a vehicle, the combination comprising; a road having a longitudinal axis and a bearing surface, said road including a steel reinforcing network integrally included therein, said reinforcing network comprising a first group of rods of high magnetic permeability positioned substantially parallel to said longitudinal axis of said road and a second group of rods of high magnetic permeability positioned substantially transversely to said axis of said road, both of said first and second groups of rods positioned substantially parallel to said bearing surface of said road; a variable-speed steerable vehicle traversing said road, magnetic means mounted on said vehicle for deriving electrical signals from the magnetic permeability characteristics of said road having a frequency indicative of the speed of said vehicle with respect thereto, said magnetic means so oriented on said vehicle that said signals derived thereby are primarily responsive to said transverse rods; first means mounted on said vehicle responsive to said magnetic means for producing an indication of said frequency; second means operatively associated with said vehicle for producing an indication corresponding to a predetermined frequency; third means mounted on said vehicle for comparing said indications; fourth means mounted on said vehicle responsive to said third means for regulating the speed of said vehicle to produce an exact comparison in said third means.

11. In a system for automatically controlling the speed of a vehicle, the combination comprising; a road having a longitudinal axis and a bearing surface, said road including a steel reinforcing network integrally included therein, said reinforcing network comprising a first group of rods of high magnetic permeability positioned substantially parallel to said longitudinal axis of said road and a second group of rods of high magnetic permeability positioned substantially transversely to said axis of said road, both of said first and second groups of rods positioned substantially parallel to said bearing surface of said road; a variable-speed steerable vehicle traversing said road, magnetic means mounted on said vehicle for deriving electrical signals from the magnetic permeability characteristics of said road having a frequency indicative of the speed of said vehicle with respect thereto, said magnetic means so oriented on said vehicle that said signals derived thereby are primarily responsive to said transverse rods; means operatively associated with said vehicle for establishing a predetermined standard frequency; modulating means operatively associated with said vehicle for modulating one of said frequencies with the other of said frequencies; first means operatively associated with said magnetic means and said means for establishing a predetermined frequency responsive to said modulating means for deriving a potential when said two frequencies are not equal, second means operatively associated with said first means for determining which of said two frequencies is the higher, and third means mounted on said vehicle responsive to said first means and said second means for adjusting the speed of said vehicle so as to make said two frequencies equal.

12. In a system for automatically controlling the bearing of a vehicle, the combination comprising; a road having a longitudinal axis and a bearing surface, said road including a steel reinforcing network integrally included therein, said reinforcing network comprising a first group of rods of high magnetic permeability positioned substantially parallel to said longitudinal axis of said road and a second group of rods of high magnetic permeability positioned substantially transversely to said axis of said road, both of said first and second groups of rods positioned substantially parallel to said bearing surface of said road; a variable-speed steerable vehicle traversing said road, first means mounted on said vehicle for deriving electrical signals from the magnetic permeability characteristics of said road indicative of the transverse position of said vehicle thereon, said means so oriented on said vehicle that said signals derived thereby are primarily responsive to said longitudinal rods; second means mounted on said vehicle for determining whether said signals conform to a predetermined standard signal, and third means mounted on said vehicle responsive to said second means for controlling the steering of said vehicle.

13. In a system for automatically controlling the bearing of a vehicle, the combination comprising; a road having a longitudinal axis and a bearing surface, said road including a steel reinforcing network integrally included therein, said reinforcing network comprising a group of rods of high magnetic permeability positioned substantially parallel to said longitudinal axis of said road, said group of rods positioned substantially parallel to said bearing surface of said road; a steerable vehicle traversing said road, said vehicle having a steering mechanism, first means mounted on said vehicle for deriving electrical signals from the magnetic permeability characteristics of said road indicative of the transverse position of said vehicle thereon, second means responsive to the signals derived by said first means for controlling the transverse movement of said vehicle with respect to said bearing surface, an alarm mounted on said vehicle operatively associated with said first and second means, and means mounted on said vehicle for actuating said alarm whenever said signals are not of such predetermined magnitude as to cause said means for controlling to respond thereto.

14. In a system for automatically controlling the position of a vehicle, the combination comprising; a road having a longitudinal axis and a bearing surface, said road including steel reinforcing integrally included therein, said reinforcing comprising a group of rods of high magnetic permeability positioned substantially parallel to said longitudinal axis of said road, said group of rods positioned substantially parallel to said bearing surface of said road; a steerable vehicle traversing said road, magnetic means mounted on said vehicle for deriving electrical signals from the magnetic permeability characteristics of said road indicative of the transverse position of said vehicle thereon, determining means mounted on said vehicle responsive to said magnetic means for determining the distance said vehicle is from a predetermined transverse position, and means mounted on said vehicle responsive to said determining means for controlling the steering of said vehicle until said predetermined transverse position is obtained.

15. In a system for automatically controlling the transverse position of a vehicle with respect to the road on which it is traveling, the combination comprising; a road having a longitudinal axis and a bearing surface, said road including steel reinforcing integrally included therein, said reinforcing comprising a group of transversely spaced rods of high magnetic permeability positioned substantially parallel to said longitudinal axis of said road, said group of rods positioned substantially parallel to said bearing surface of said road; a steerable vehicle traversing said road, said vehicle having a steering mechanism; magnetic means mounted on said vehicle for deriving signals from the magnetic permeability characteristics of said road indicative of the transverse position of said vehicle on said road, said magnetic means so oriented on said vehicle that said signals derived thereby are primarily responsive to said longitudinal rods, determining means mounted on said vehicle responsive to said magnetic means for determining the rate at which said vehicle is departing from said longitudinal axis of said road, and means mounted on said vehicle responsive to said determining means for controlling said steering mechanism.

16. In a system for automatically controlling the position of a motor vehicle with respect to a road, the combination comprising; a road having a longitudinal axis and a bearing surface, said road including steel reinforcing integrally included therein, said reinforcing comprising a group of transversely spaced rods of high magnetic permeability positioned substantially parallel to said longitudinal axis of said road, said group of rods positioned substantially parallel to said bearing surface of said road; a steerable vehicle traversing said road; first means mounted on said vehicle for deriving electrical signals from the magnetic permeability characteristics of said road indicative of the transverse position of said vehicle thereon; second means mounted on said vehicle responsive to said first means for indicating whether said derived signals indicate that said vehicle is not in a proper predetermined position, third means mounted on said vehicle responsive to said first means for determining the direction of motion of said vehicle required for said vehicle to reach said predetermined position, and fourth means mounted on said vehicle responsive to said second means and said third means for controlling the steering of said vehicle.

References Cited in the file of this patent

UNITED STATES PATENTS

| | | |
|---|---|---|
| 1,266,389 | Betz | May 14, 1918 |
| 1,575,579 | Howe | Mar. 2, 1926 |
| 2,493,755 | Ferrill | Jan. 10, 1950 |
| 2,661,070 | Ferrill | Dec. 1, 1953 |
| 2,742,099 | Hagen | Apr. 17, 1956 |
| 2,750,583 | McCullough | June 12, 1956 |